US010554789B2

(12) United States Patent
Rosintoski

(10) Patent No.: US 10,554,789 B2
(45) Date of Patent: Feb. 4, 2020

(54) KEY BASED AUTHORIZATION FOR PROGRAMMATIC CLIENTS

(71) Applicant: Coupa Software Incorporated, San Mateo, CA (US)

(72) Inventor: Bradley Rosintoski, San Mateo, CA (US)

(73) Assignee: Coupa Software Incorporated, San Mateo, CA (US)

( * ) Notice: Subject to any disclaimer, the term of this patent is extended or adjusted under 35 U.S.C. 154(b) by 367 days.

(21) Appl. No.: 15/351,049

(22) Filed: Nov. 14, 2016

(65) Prior Publication Data

US 2018/0139198 A1 May 17, 2018

(51) Int. Cl.
*G06F 7/04* (2006.01)
*G06F 15/16* (2006.01)
*G06F 17/30* (2006.01)
*H04L 29/06* (2006.01)
*H04L 29/08* (2006.01)
*G06F 16/951* (2019.01)
*G06F 16/9038* (2019.01)

(52) U.S. Cl.
CPC .......... *H04L 67/42* (2013.01); *G06F 16/9038* (2019.01); *G06F 16/951* (2019.01); *H04L 67/02* (2013.01)

(58) Field of Classification Search
CPC ....... H04L 67/42; H04L 67/02; H04L 63/108; G06F 16/9038; G06F 16/951
See application file for complete search history.

(56) References Cited

U.S. PATENT DOCUMENTS

| 8,812,959 | B2* | 8/2014 | Bousseton | G06Q 30/02 380/281 |
| 9,665,700 | B2* | 5/2017 | Morelli, Jr. | G06F 21/31 |
| 9,768,969 | B2* | 9/2017 | Weinstein | H04L 12/185 |
| 2002/0133627 | A1* | 9/2002 | Maes | H04L 67/2819 709/246 |
| 2007/0104326 | A1* | 5/2007 | Feigenbaum | G06F 21/6227 380/44 |
| 2008/0189360 | A1* | 8/2008 | Kiley | H04L 67/306 709/203 |

(Continued)

*Primary Examiner* — Lynn D Feild
*Assistant Examiner* — Vadim Savenkov
(74) *Attorney, Agent, or Firm* — Hickman Palermo Becker Bingham LLP

(57) ABSTRACT

Key based authorization for programmatic clients is described. One or more server computers receive a request for an action on one or more target resources, the request indicating the action to be performed on the one or more target resources at the resource access point, and a key identifying a client program running on a client computer system. A data store that stores mapping data representing one or more associations among keys, actions and target resources is queried. An existence, in the data store, of an association of a particular key corresponding to a particular client program, with a particular target resource and with a particular action associated with the particular target, represents the particular client program having authorization to perform the particular action on the particular target resource. The system authorizes performance of the action on the one or more target resources for the request.

20 Claims, 9 Drawing Sheets

```
HTTP/1.1
GET http://api.coupa.com/api/business_groups
Host: coupa.com/rest
Accept: application/xml
Auth-Key: 123456789
```
605

```
HTTP/1.1
GET http://api.coupa.com/api/business_groups/2
Host: coupa.com/rest
Accept: application/xml
Auth-Key: 123456789
```
610

(56) References Cited

U.S. PATENT DOCUMENTS

| | | | | |
|---|---|---|---|---|
| 2009/0249489 | A1* | 10/2009 | Livshits | G06F 21/54 |
| | | | | 726/26 |
| 2013/0067594 | A1* | 3/2013 | Kantor | G06F 21/6218 |
| | | | | 726/28 |
| 2014/0195588 | A1* | 7/2014 | Badge | H04L 65/403 |
| | | | | 709/203 |
| 2015/0288701 | A1* | 10/2015 | Brand | H04L 63/102 |
| | | | | 726/7 |
| 2017/0163690 | A1* | 6/2017 | Graham | H04L 63/10 |
| 2017/0289293 | A1* | 10/2017 | Rubtsov | H04L 67/2823 |

* cited by examiner

```
HTTP/1.1
GET http://api.coupa.com/api/business_groups
Host: coupa.com/rest
Accept: application/xml
Auth-Key: 123456789
```
605

```
HTTP/1.1
GET http://api.coupa.com/api/business_groups/2
Host: coupa.com/rest
Accept: application/xml
Auth-Key: 123456789
```
610

FIG. 6

KEY BASED AUTHORIZATION FOR PROGRAMMATIC CLIENTS

TECHNICAL FIELD

The technical field to which the present disclosure generally relates is computer software and computer hardware in the field of information security. The technical field also includes secure key-based access authorization for client programs in client-server systems.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Increased use of distributed computer program applications, which run on multiple computer systems, has spurred the need for increased programmatic access among the systems. Numerous application programming interfaces (APIs) and new protocols have been developed that permit client applications running on client computer systems to make calls or other forms of programmatic requests to server application systems at other computers. A computer program initiating such a request to a remote server application system may do so independent of any request by an individual user of the computer program and thus may lack a user context for security authorization.

Many programmatic access APIs have been developed to utilize stateless protocols that have been traditionally used by individual users to access web applications. For example, programmatic interface protocols such as SOAP (Simple Object Protocol) or REST (REpresentational State Transfer) use HTTP (Hyper Text Transfer Protocol), which is traditionally used by client browsers under control of individual users to request and update data from a remote client system. HTTP is stateless so a server computer receiving an API call may have no security context or other security data with which to determine whether to accept and process the API call.

Authentication and authorization through a protocol such as HTTP have been closely tailored to the needs of individual users. Both the protocols, as well as the web server application servicing the protocol, have integrated authentication and authorization systems that are better suited for an individual user rather than a programmatic client. For example, individual user authentication and authorization usually involves an individual user selecting a particular user identifier to represent her identity and a particular password to be the secret shared only with the web application to be accessed. The user identifier is usually public and can be displayed by the web application's user interface or shared with other users (such as having the user identifier in a shared activity logs for records that are caused by the user). On the other hand, the user password is kept private and is a secret that cannot be shared under any circumstances.

Adapting the same access paradigm to a programmatic client application may not be efficient. A programmatic client, having no concern about the privacy, may not have a need to provide two different credentials, a user identifier and a password, for its access to a web application. Managing and maintaining extra credentials for each programmatic client may lead to wasteful use of resources, especially for a large number of programmatic clients, and creates a security vulnerability because the credential database could be attacked.

Additionally, the authorization scope of a server application system for an individual user may drastically differ from that of a programmatic client. An individual user may have authorization that is based on a role of the user. To minimize a number of authorization checks for each rendering of a user interface and processing input from the user interface, a particular role may be specified that covers all features of a web page user interfaces rendered by a web application. Thus, users that are granted the authorization of the particular role generally have full access to all the resources described on the web page. For example, a user with a "user administrator" role may have a full access to a web page that presents and configures all the resources related to user administration such as user accounts, user addresses, group affiliations and so on. But a programmatic client application that is used for an employee directory may only need authorization to retrieve first names and last names of users and their respective groups. Granting such a client application the "user administrator" role is unnecessary and perhaps, could expose the web application to a potential security breach as an employee directory application may not be as secure as the web application that manages users.

BRIEF DESCRIPTION OF THE DRAWINGS

In the drawings:

FIG. 6 depicts example portions of an HTTP header from REST-based requests that include programmatic authorization keys, in an embodiment;

DESCRIPTION OF EXAMPLE EMBODIMENTS

Figure 1:
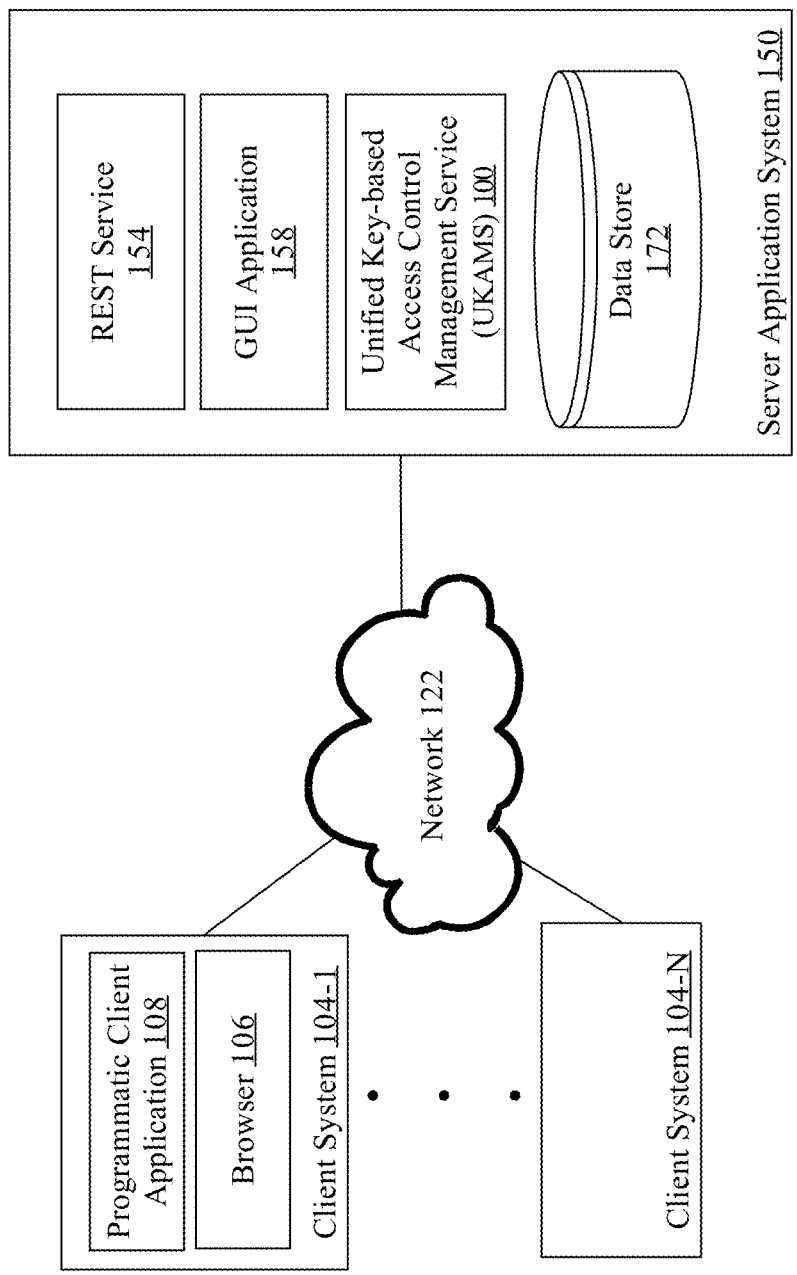
FIG. 1 illustrates an example operating environment upon which an embodiment may be implemented.

Techniques for key based authorization for programmatic clients are described. In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

Embodiments are described herein according to the following outline:

1.0 General Overview
2.0 Example Operating Environment
3.0 Generating Key for Programmatic Client Application 4.0 Updating Key Authorization
5.0 Authorizing Programmatic Client Access
6.0 Implementation Mechanisms—Hardware Overview
7.0 Extensions and Alternatives

1.0 General Overview

Key based authorization for programmatic clients is described. In an embodiment, one or more servers receive a request for an action on one or more target resources at a resource access point of the one or more servers, the request indicating the resource access point, activity data indicating the action to be performed on the one or more target resources at the resource access point, and a key identifying a client program running on a client computer system. Using the activity data and the key, a data store that stores mapping data representing one or more associations among keys, actions and target resources is queried. The existence, in the data store, of an association of a particular key corresponding to a particular client program, with a particular target resource and with a particular action associated with the particular target, represents the particular client program having authorization to perform the particular action on the particular target resource. Based on the querying, the system determines that the mapping data includes an association of the key with the one or more target resources and with the action associated with the one or more target resources. The system authorizes performance of the action on the one or more target resources for the request.

One solution to provide an efficient and effective authorization management for programmatic client applications is to assign a unique programmatic interface key to each programmatic client. In this context, the term "programmatic interface key" (or "key") refers to a computer generated identifier value that can be used to identify a client application that sends a request to a programmatic interface of a server application system.

In an embodiment, a request sent by a programmatic client application contains activity data that specifies an action to be performed by the server application system on a target resource. In this context, "activity data" refers to data that represents the association of one or more target resources with one or more actions that can be performed on the one or more target resources. The term "target resource" refers to an entity managed by the server application system on which one or more actions may be performed by the server application system. For example, a service running on a system that is managed by the server application system is a target resource. A target resource may be identified by a resource identifier by the managing server application system.

In an embodiment, a client request for an action on a target resource specifies a resource access point of the server application system and activity data of the request. The "resource access point" term refers herein to an address of a network location that receives requests for actions on one or more target resources. In addition to the activity data of a request, the resource access point may be used to determine one or more target resources and/or the requested action to be performed on the one or more target resources.

For example, in an HTTP based request from a client application, the HTTP request may specify an HTTP method and the URL (Uniform Resource Locator) of a resource access point to perform the method. For REST-based HTTP request, the URL and the HTTP method may be used to determine the action and the one or more target resources on which to perform the action. The URL for such a REST request may contain a URI (Uniform Resource Identifier) that corresponds to the resource identifier of the requested target resource. Alternatively, the URI may correspond to a group of target resources. In a different example, a SOAP-based HTTP requests may similarly indicate the resource identifier of a target resource or a group of target resources as a parameter value in the SOAP method specified by the request. The SOAP method in its turn may indicate the action to be performed on the target resource or the group of target resources.

In an embodiment, to authorize programmatic requests like SOAP or REST-based HTTP requests, the receiving server application system authorizes the requests using a Unified Key-based Access Control Management Service (UKAMS). The UKAMS generates, manages and verifies keys for client applications issuing the programmatic requests to resource access points of a server application system.

The UKAMS may unify the authentication and authorization of client requests by using the key provided by a client application as part of the request authentication to further determine whether the client application has authorization to cause the server application system to perform the requested action on the one or more target resources. For example, the same programmatic key used by a client to authenticate a SOAP or REST based HTTP request is used by the server application system to check the authorization of the request.

In an embodiment, the server application system maintains a data store that stores activity and authorization data for authorization of programmatic requests. The "authorization data" refers herein to mapping data that associates one or more actions that can be performed on one or more target resources with a key of a client application that is authorized to request the one or more actions on the one or more target resources. Accordingly, if a client application sends a request to a resource access point for an action to be performed on one or more target resources, authorization data can be used to check if associations exist between the one or more target resources, the action and the key of the client application. If such associations exist, then the UKAMS grants authorization for the request, and the server application system may perform the requested action on the one or more target resources.

In an embodiment, the server application system additionally maintains statuses of keys which indicate whether a key can be used for authorization. A set of statuses for a key indicate that the key can be used for authorization and a set of statuses for a key indicate that the key cannot be possibly used for authorization. For example, a key with an active status can be used to authorize a request for at least one action on an at least one target resource. Another status of a key, an expired status, indicates that the expiration date assigned to the key has passed, and the key can no longer be used for any authorization for any action on any target resource. Yet another status of key that indicates no authorization is a revoked status. A key may be assigned to a revoked status when the key has been compromised such as, when a programmatic client application using the key has been found to have a security breach. The server application system may receive a request to revoke a key corresponding to the programmatic client application, and in response, may update the key status to indicate the revoked status. Any client with a revoked key may not be authorized to request any action on any target resource.

2.0 Example Operating Environment

FIG. 1 illustrates an example operating environment upon which an embodiment may be implemented.

In FIG. 1, one or more client computer systems 104-1 through 104-N are coupled to Server Application System (SAS) 150 using Network 122. Any number N of client computer systems may be used, as indicated by the diagram and the designation 104-N. SAS 150 may comprise one or more server computers, virtual computing instances, or other computing elements that host or execute a REST service 154 and GUI application 158. The client systems 104-1 through 104-N and SAS 150 may form a client-server distributed computing system that hosts or executes a client-server application system represented by programmatic client application 108 and REST service 154 as an example. Client systems 104-1, 104-N also may execute a browser 106 for purposes of receiving and rendering electronic documents, such as web pages or HTML documents, which GUI application 158 of SAS 150 generates and transmits in operation. Any one or more of the client systems 104-1, 104-N may comprise a mobile computing device such as a laptop computer, tablet computer or smartphone; the browser 106 may be a mobile web browser and the programmatic client application 108 may be a mobile app. Desktop computers, workstations and other computing devices also may be used for client system 104-1, 104-N.

Network 122 broadly represents a telecommunications network comprising any combination of a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), or a cellular network.

SAS 150 may include Unified Key-based Access Control Management Service (UKAMS) 100 for generating, authenticating and/or authorizing programmatic keys such as from client systems 104-1 through 104-N. In an embodiment, UKAMS 100 is hosted on a same computing device as one or more other components of SAS 150. In an alternative embodiment, UKAMS 100 is hosted on a different computing device connected to other components of SAS 150 using Network 122 or using a network different than the network connecting client systems 104-1, 104-N to SAS 150.

In an embodiment, UKAMS 100 may store the keys (such as those generated for programmatic client application 108) in a data store 172. The keys in data store 172 may be associated with activity data representing actions authorized for the key to be performed on target resources.

In an embodiment, programmatic client 108 hosted by a client system 104-1 may sent a request for an action on a target resource that is managed by SAS 150. For example, programmatic client application 108 may establish connection with SAS 150 using HTTP protocol and send a REST request over HTTP to a resource access point of REST service 154. Upon the receipt of the request, SAS 150 may request UKAMS 100 (by establishing connection and/or issuing an application programming interface (API) call) to determine the authorization of programmatic client application 108. For example, SAS 150 may use the key that is retrieved from the client request and is used to identify programmatic client application 108 to issue a query to data store 172 using UKAMS 100. In an embodiment, data store 172 stores authorization data, activity data and/or metadata about programmatic authorization keys. Additionally, data store 172 may store additional application data of SAS 150.

3.0 Generating Key for Programmatic Client Application

In an embodiment, SAS 150 includes the graphical user interface (GUI) application 158, which is programmed for users of client systems to request and manage keys for programmatic client applications. For example, an administrator user of client system 104-1 may use browser 106 to access GUI application 158 and request web pages for managing the keys for programmatic client application 108. Through GUI application 158, the administrator may request UKAMS 100 to generate a key for programmatic client application 108 and authorize the key for a number of actions on a number of target resources.

Figure 2A:
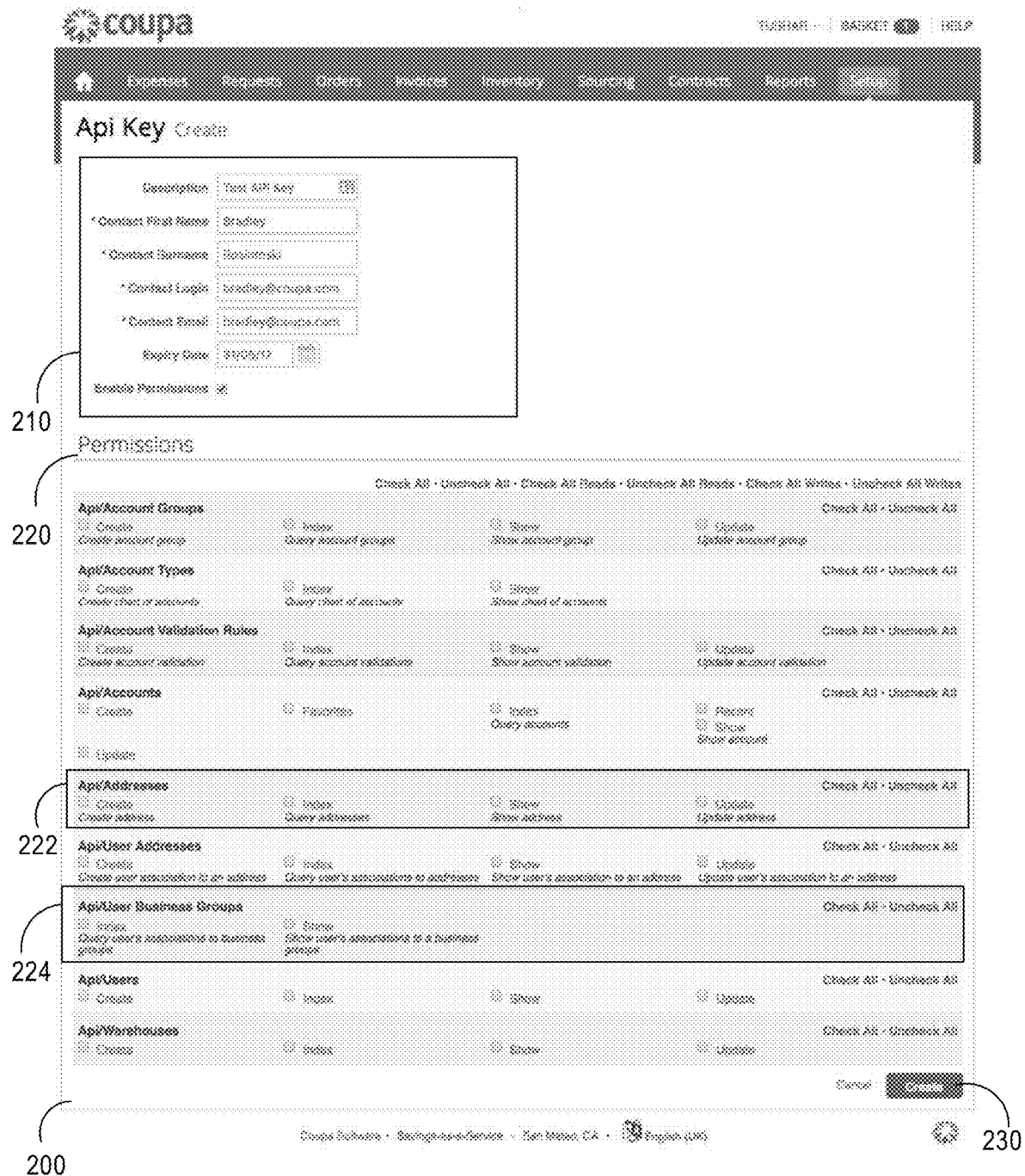
FIG. 2A, FIG. 2B, FIG. 2C depict examples of graphical user interface for managing key based authorization of a programmatic client application, in one or more embodiments.

FIG. 2A depicts an example of graphical user interface for requesting to generate a key for a programmatic client application. In an embodiment, GUI application 158 of SAS 150 generates and transmits a GUI form to client system 104-1, which renders the form using browser 106 as GUI form 200. GUI form 200 includes controls that enable client system 104-1 to request generation of a new key by providing metadata about the new key and selecting a proper set of authorization for each group of target resources for the new key. Controls 210 present a form for user to provide metadata about the new key. For example, input from the client system 104-1 can specify the expiration date for the new key as well as the description of a programmatic client application for which the new key is to be created.

The controls 220 are programmed to present a form for selecting target resources and actions on the target resources that are to be authorized for the new key. The controls 220 are programmed to display a list of groups of target resources managed by SAS 150 with descriptions of the groups of target resources and a list of selectable actions available to be performed on each of the group of target resources. If a selectable control for an action is selected for a group of target resources, then, upon successful submission of GUI form 200, the new key is authorized for the selected action on any target resource in the selected group of target resources.

For example, controls 222 represent the "address" group of target resources and controls 224 represent the "business groups" group of target resources. If a "show" action control is selected with controls 222, then the new key is requested to be given authorization to retrieve a particular "address" target resource using the programmatic interface of SAS 150. On the other hand, selection of the "index" user control in controls 224 requests authorization to list all target resources in the "business groups" group of target resources.

Upon selection of "create" button 230, GUI form 200 is submitted to SAS 150 through GUI application 158, in an embodiment. Upon the receipt of the submission, GUI application 158 may request UKAMS 100 to generate the key and associate the key with the selected actions for the respective target resources.

Figure 3:
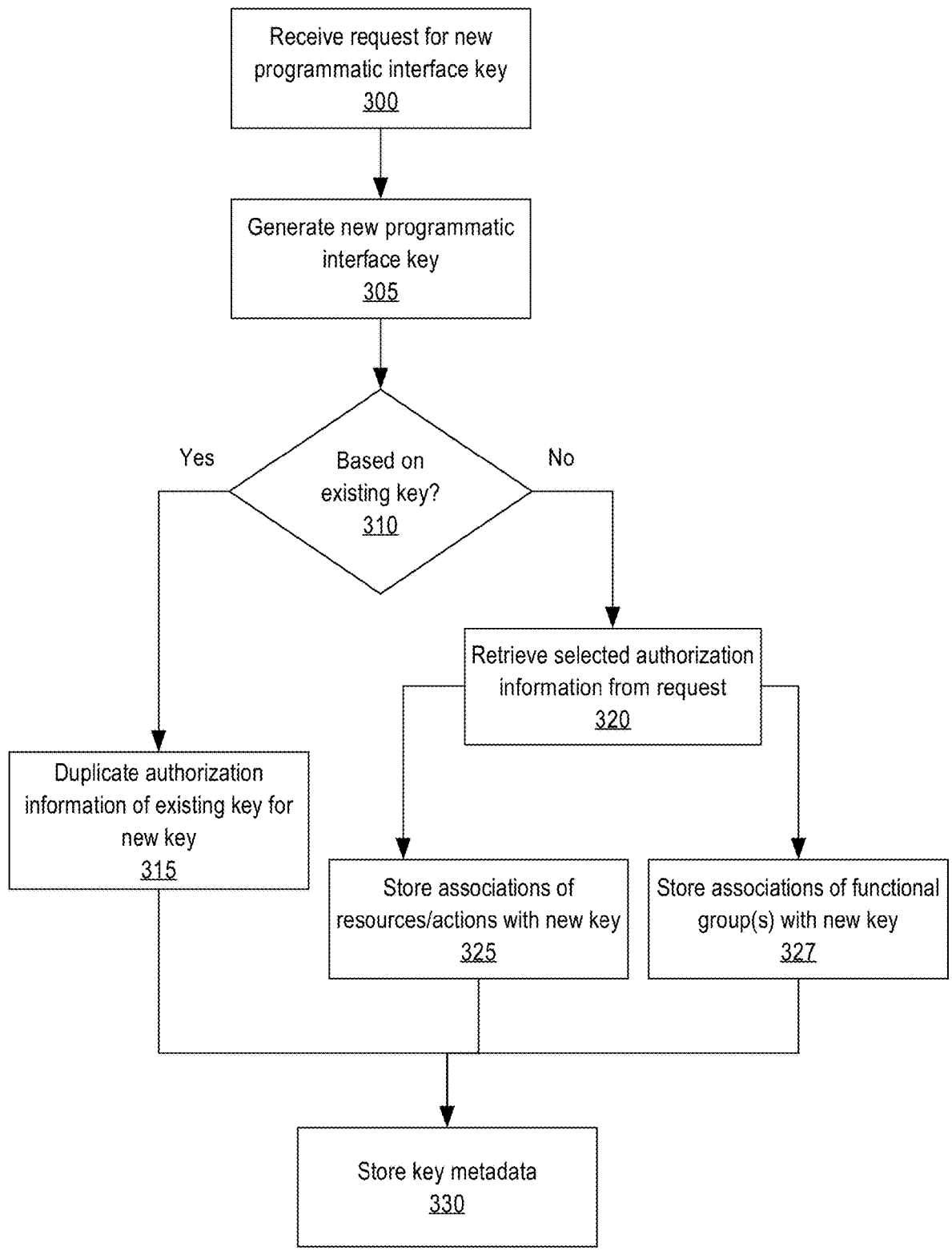
FIG. 3 is a flow diagram that depicts a process for generating a new programmatic key, in an embodiment.

FIG. 3 is a flow diagram that depicts a process for generating a new programmatic key, in an embodiment. FIG. 3 and each other flow diagram herein illustrates an algorithm that may be used as the basis of programming computers to implement the functions that are further described in this section, at the same level of skill that is normally used to communicate program plans, program designs, algorithms or programming methods among persons at the ordinary level of skill to which this disclosure is directed. That is, FIG. 3 and each other flow diagram herein is expressed at the same level of detail that persons of skill in this field normally use to communicate with one another about methods, algorithms, plans or specifications for computer programs to implement processes, functions or operations within this technical field.

At block 300, the process receives a request for a new programmatic interface key. For example, UKAMS 100 receives a request for a new programmatic key from one or more other components of SAS 150. At block 305, the process generates a new programmatic interface key. For example, UKAMS 100 may generate a new key for a programmatic interface of SAS 150. In another embodiment, SAS 150 or a client system requesting the key may generate the new key, and the request received by UKAMS 100 already contains the new key.

At block 310, the process tests whether the new programmatic interface key is based on an existing key. For example, UKAMS 100 determines whether the request for the new key contains a reference to an existing key on which the authorization of the new key is to be based. If so, then at block 315, the process duplicates authorization information of an existing key for the new key. For example, UKAMS 100 queries data store 172 for the authorization data of the referenced existing key and reassigns to or duplicates the authorization data for the new key. When the authorization data of the existing key is assigned to the new key, the new key acquires the same authorization as the existing key.

At block 310, UKAMS 100 may determine the request contains authorization data for the new key by, for example, failing to reference an existing key. If so, then, at block 320, the process retrieves selected authorization information from the request. For example, UKAMS 100 retrieves the authorization information for the new key from the request. The authorization information describes the selected actions for the target resources to be authorized for the new key.

Based on the authorization information in the request, at block 325, the process stores associations of resources or actions with the new key. For example, UKAMS 100 stores in data store 172 authorization data that associates the new key with the selected one or more target resources and the respective selected actions for each of the one or more target resources.

In an embodiment, UKAMS 100 maintains functional groups in data store 172. The "functional group" term refers herein to a grouping of associations of one or more target resources with one or more actions on each of the one or more target resources that correspond to the functionality of the grouping. Membership of a key in a functional group, grants the key the authorization to request the actions on the target resources that are part of the functional group. For example, a functional group for displaying employee directory information functionality may include the associations of the "index" and "show" actions with the "Api/Users" group of target resources and the "index" and "show" action with the "Api/Business Groups" group of target resources. Any key that with a membership of the functional group for displaying employee directory would have the authorization to requesting indexing and showing of both the "Api/Users" and "Api/Business Groups."

Additionally or alternatively, the authorization data retrieved at block 320 for a new key may include memberships of one or more functional groups. Data store 172 may maintain activity data for each functional group that describes associations of one or more target resources with one or more actions that can be performed on each of the one or more target resources as part of the functionality of the functional group. At block 327, the process stores associations of functional groups with the new key. For example, UKAMS 100 may store authorization data in data store 172 for the new key that includes membership association of the new key with the activity data of the one or more functional groups.

At block 330, key metadata is stored. For example, UKAMS 100 stores the received metadata for the new key in data store 172, in an embodiment. The metadata may include an expiration date of the key as well as other data describing the key such as information about the programmatic client application that intends to use the new key for authorization. If the new key is based on an existing key, the metadata of the existing key with the exception of the expiration date may be stored in data store 172 for the new key. The new key's status, unless otherwise specified in the key generation request to UKAMS 100, may be assigned to an active status in the stored metadata of the new key, in an embodiment.

4.0 Updating Key Authorization

UKAMS 100 may allow authorization data of a key to be updated. Additionally, key metadata of the key may also be updateable by UKAMS 100. In an embodiment, GUI Application 158 of SAS 150 may present, through browser 106 of client system 104-1, a user interface that displays existing keys available for update.

Figure 2B:
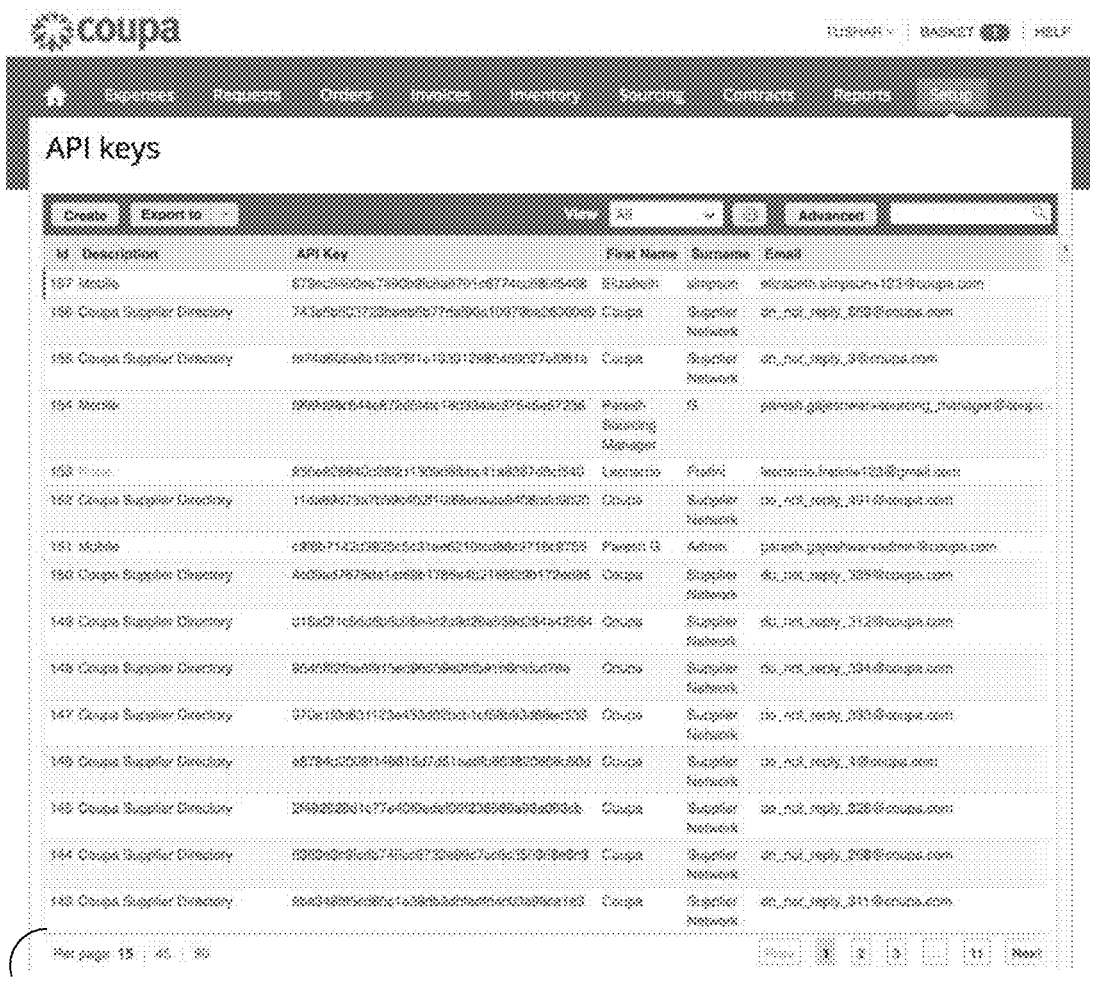

FIG. 2B depicts an example of a graphical user interface for listing programmatic interface keys available for update, in an embodiment. GUI 202 of FIG. 2B displays selectable user controls describing each key. Selecting such a user control for a key generates a request to GUI application 158 to present a user interface with the authorization data and the metadata for the key.

Figure 2C:
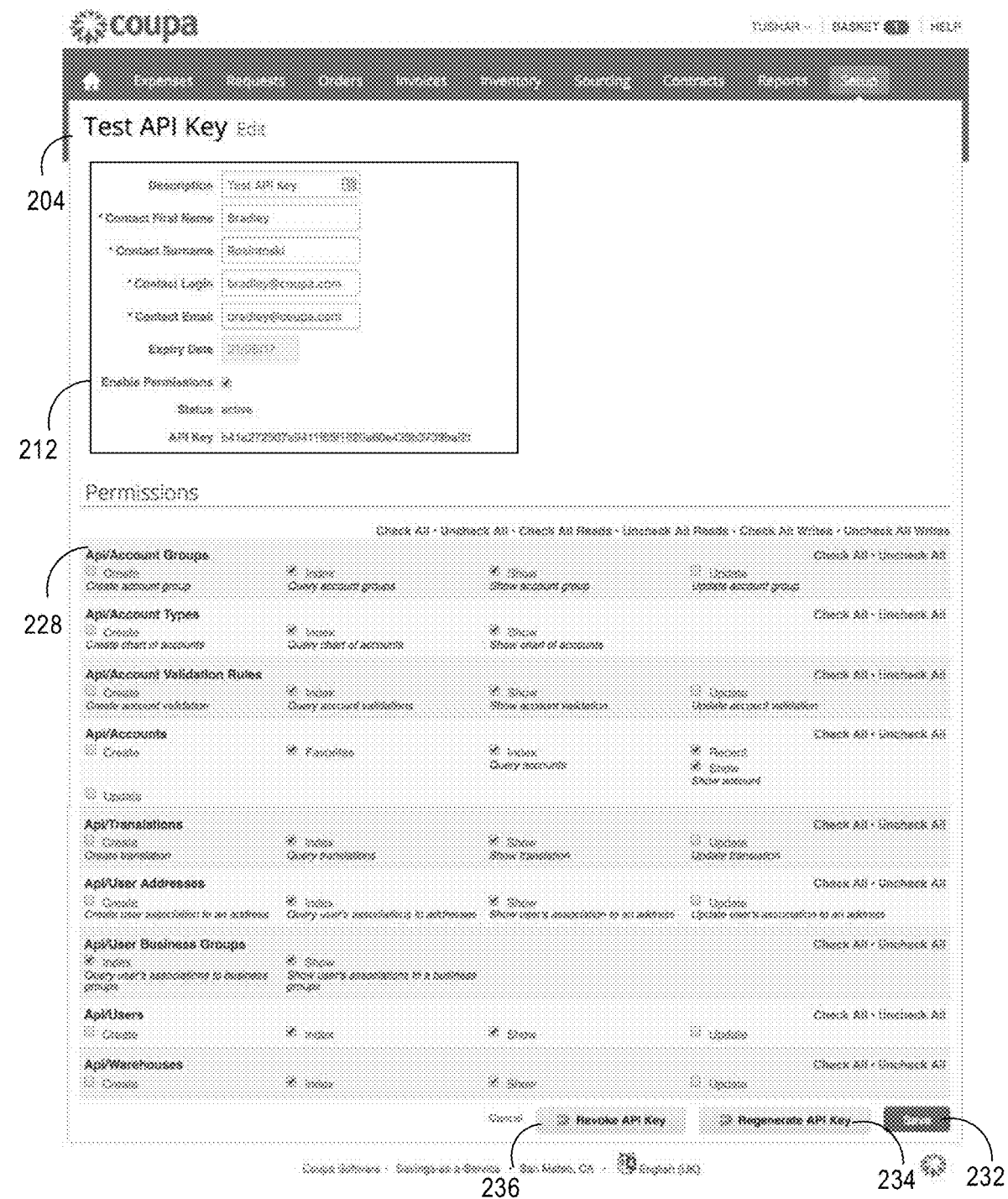

FIG. 2C depicts an example of a graphical user interface for requesting to update authorization data and metadata of a selected programmatic interface key, in an embodiment. GUI form 204 depicts graphical controls that enable a user to update authorization data and metadata of the selected key. The controls 212 of GUI form 204 initially display the current metadata about the key and can be edited to request an update of the metadata.

In an embodiment, expiration date of a key may not be updateable by a user. In order to extend a user of programmatic key to access a programmatic interface, a new key may need to be generated. For example, continuing with FIG. 2C, controls 212 display the expiration date of the selected key to the user but the user control to change the expiration date is read-only and does not allow a change to be made to the expiration date. "Regenerate API Key" button 234 may be selected for requesting a new key for which the expiration date may be changed to a different date. The selection of "Regenerate API Key" button 234 may cause blocks 300-315 and 330 of FIG. 3 to be executed by UKAMS 100.

On the other hand, continuing with an example user interface depicted in FIG. 2C, selection of "Revoke API Key" button 236 causes UKAMS 100 to update the status of the selected key to a revoked status. "Save" button 232 updates any other changes made to controls 212 or controls 228.

Figure 4:
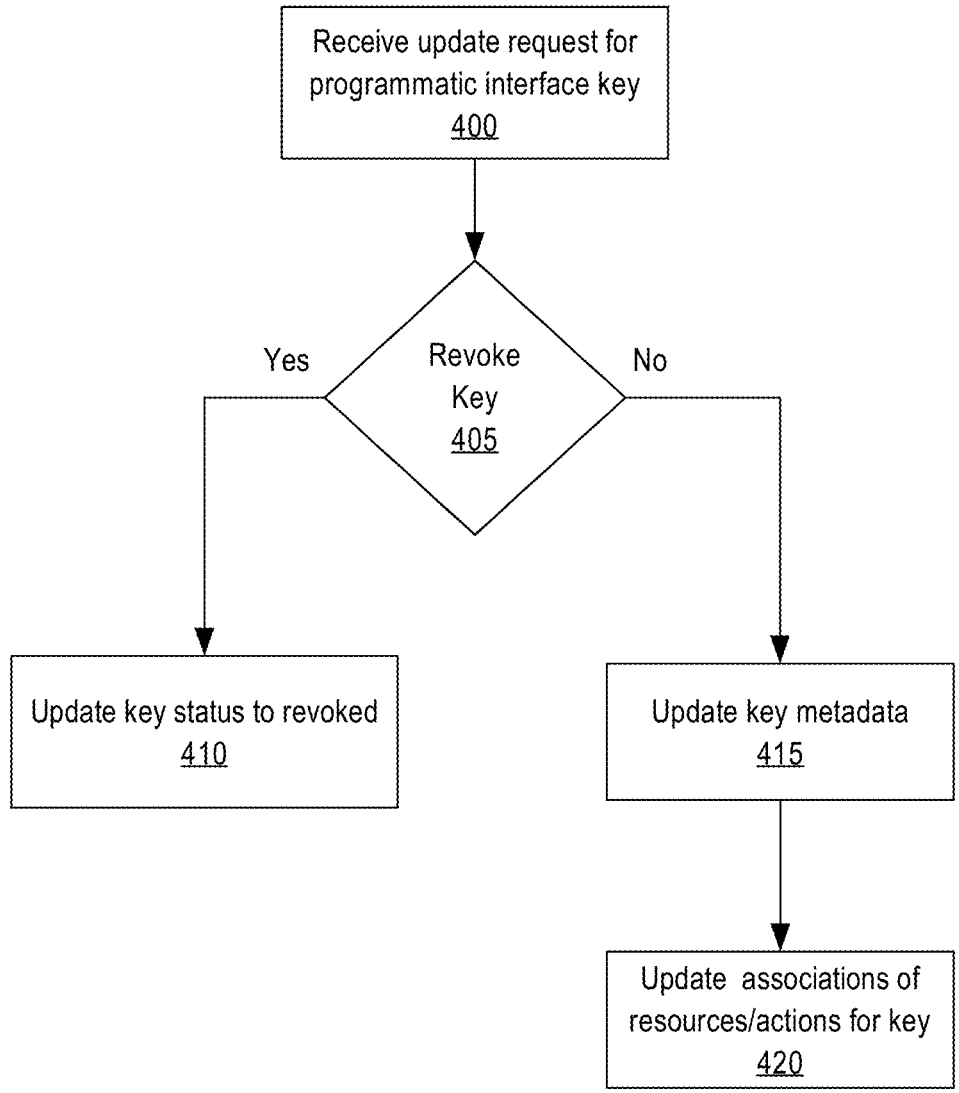
FIG. 4 is a flow diagram that depicts a process for updating metadata and/or authorization data for a selected key, in an embodiment.

FIG. 4 is a flow diagram that depicts a process for updating metadata and/or authorization data for a selected key, in an embodiment.

At block 400, the process receives an update request for a programmatic interface key. For example, UKAMS 100 receives a request to update metadata and/or authorization data for a referenced programmatic interface key. The request may have been generated and received in response to SAS 150 receiving a request from a user to update information for the selected key.

At block 405, the process tests whether the request specifies to revoke the key. For example, UKAMS 100 determines whether the request contains a request to revoke the selected key. If so, at block 410, the process updates the key status to REVOKED or the equivalent. For example, UKAMS 100 updates the status of the selected key to indicate a revoked status in data store 172. In an embodiment, regardless of the content of the request, no other update is made for the selected key in data store 172 because the selected key can no longer be used by any client to access SAS 150.

On the other hand, if at block 405, the request contains no revocation of the selected key, then at block 415, the process updates the key metadata. For example, UKAMS 100 may update key metadata stored in data store 172 with the metadata contained in the request. At block 420, the process updates associations of resources or actions for the key. For example, UKAMS 100 updates the authorization data of the selected key to reflect the associations of actions and target resources indicated in the request. In an embodiment, before storing the new authorization data, UKAMS 100 inactivates the selected key's authorization data that associates the key with the existing one or more target resources and one or more actions authorized for the key to be performed on the one or more target resources.

Additionally or alternatively, the update request may indicate one or more functional groups to be associated with the selected key. UKAMS 100 receives the update request and stores the authorization indicating a membership of the selected key with the selected one or more functional groups in data store 172. In an embodiment, data store 172 may already store the activity data for the functional group and thus may update the authorization data of the selected key by associating the selected key with the activity data. Alternatively, UKAMS 100 stores authorization data in data store 172 that includes selected key's associations with one or more target resources and with one or more actions on each of the one or more target resouces that are part of the functional group indicated by the update request.

5.0 Authorizing Programmatic Client Access

Figure 5:
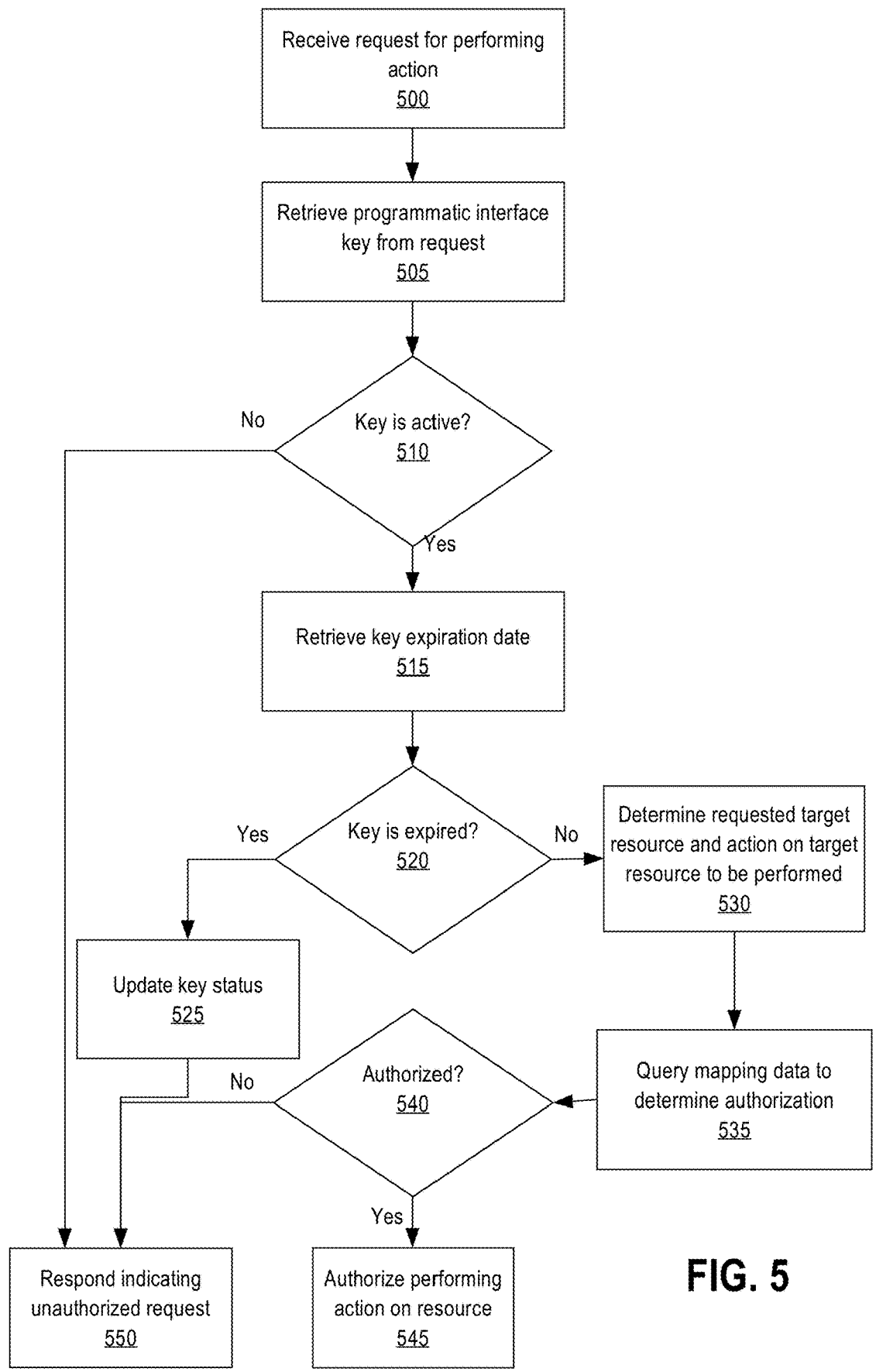
FIG. 5 is a flow diagram depicting a process for determining authorization for a programmatic request, in an embodiment.

FIG. 5 is a flow diagram depicting a process for determining authorization for a programmatic request for an action on one or more target resources, in an embodiment.

At block 500, the process receives a request for performing an action. For example, SAS 150 receives a programmatic request from a programmatic client application, such as programmatic client application 108, addressed to a resource access point. A programmatic request, in this context, is a set of digital data that is electronically transmitted from one computer program running on one computer system to another under program control, such as an API call, a method invocation, a function invocation, or a remote procedure call. In some embodiments, the request is a REST (Representational State Transfer) request via HTTP (HyperText Transfer Protocol), and an HTTP header of the request may specify an HTTP method that identifies the action requested to be performed on the one or more target resources.

At block 505, the process retrieves a programmatic interface key from the request. For example, SAS 150 retrieves a programmatic access key from the request and requests UKAMS 100 to verify the status of the key.

At block 510, the process tests whether the key is active. For example, UKAMS 100 determines the status of the key by querying data store 172 for the metadata of the key. If the status of the key is inactive at block 510 or the key does not exist in data store 172, then the process transitions to block 550. The key may be inactive if the key status, for example, indicates that the key has expired or has been revoked. At block 550, the process responds to the key authorization request indicating the key is unauthorized, and the programmatic request is unsuccessful. UKAMS 100 may generate and transmit such a response.

At block 510, if UKAMS 100 determines the key is active, then the process transitions to block 515, at which the process retrieves the key expiration date. For example, UKAMS 100 queries and retrieves a key expiration date value from data store 172 from metadata of the key. UKAMS 100 also may obtain the expiration date from the metadata retrieved at block 510.

In an embodiment, at block 520, the process determines whether the key has expired. To determine whether the key has expired, UKAMS 100 may compare the expiration date with the current time stamp or the time stamp of the request. To do so, UKAMS 100 may convert the expiration time and the obtained time stamp to the same time zone. Depending on the accuracy of the expiration time representation (e.g. year, month, date, hour), UKAMS 100 may convert the expiration time to an expiration time stamp. For example, if the expiration time is represented only in the accuracy of calendar dates and has not information about hours/minutes/seconds, then UKAMS 100 may use the midnight timestamp of that date for the expiration time stamp.

Based on the comparison, UKAMS 100 determines whether the request key has expired. For an expired key, the process transitions to block 525, where UKAMS 100 may update the key status to an expired status in data store 172. At block 550, the process responds with an indication the key is not authorized. Thus, when another subsequent request is received with the same key, the subsequent request is determined to be unauthorized without UKAMS 100 obtaining the expiration date of the key. Rather, UKAMS 100 may determine that the key for the subsequent request is expired and based on the previously updated status of the key at block 510. Accordingly, UKAMS 100 saves computer resources by avoiding execution of blocks 515, 520 for subsequent requests.

FIG. 6 depicts example portions of an HTTP header from a REST-based request that includes a programmatic authorization key, in an embodiment. Such an HTTP header may be generated as a result of programmatic client application 108 establishing an HTTP connection with SAS 150 and sending a REST-based request to SAS 150. HTTP header portion 605 of FIG. 6 includes HTTP method "GET" addressed to the "http://api.coupa.com/api/business_groups" resource access point URL. To access one or more resources at the resource access point, client application 108 has provided a programmatic authorization key as part of the "Auth-Key" HTTP custom header field. Upon the receipt, REST Service 154 may request UKAMS 100 to determine the status of the key. In response, UKAMS 100 queries data store 172 using the key from HTTP header portion 605. If no key is found in data store 172 or the returned status for the key is inactive (expired or revoked), then UKAMS 100 returns to REST Service 154 that the key authorization has failed. REST Service 154 generates and sends an appropriate HTTP response to the programmatic client application 108.

Otherwise, if the current status of the key is active, UKAMS 100 retrieves the expiration date for the key, if any, and compares the expiration date with the provided or acquired date time of the request. If the key is determined to be expired based on the comparison, the key's status in data store 172 is updated to indicate an expired status. Subsequent requests, using the same key as depicted in the example of FIG. 6 by HTTP header portion 610, are determined to be unauthorized due to the expired status of the key.

For a key that is determined not to be active (not expired and/or not revoked), the process transitions to block 530 to determine the requested action(s) and target resource(s) on which the action(s) are to be performed. At block 530, SAS 150 determines, using the request's activity data, the one or more target resources and the one or more actions to be performed on each of the one or more target resources. In an embodiment, a resource identifier for the requested one or more target resources may be determined using the address of the resource access point to which the programmatic request is addressed.

Continuing with FIG. 5, as an example, HTTP header portion 610 includes a resource access point URL of "http://api.coupa.com/api/business_groups/2." From the URL, REST Service 154 may determine that the requested target resource has the "api/business_groups/2" resource identifier.

According to a different embodiment, a resource access point address may be used to determine a group of requested target resources. For example, HTTP header portion 605 of FIG. 6 includes a resource access point URL of "http://api.coupa.com/api/business_groups" which, in this example, corresponds to a URI for the "api/business_groups" group of target resources.

In an embodiment, the type of the requested one or more target resources is used to determine the one or more requested actions. For example, the HTTP method GET may map to a read action if a resource identifier identifies a single target resource, and the same HTTP method GET may map to a list/index action if a resource identifier identifies a group of target resources.

Continuing with FIG. 5, for example, HTTP header portion 610 indicates a singular target resource, "api/business_groups/2," which is the URI for the second instance of a business group in the "api/business_groups" group of target resources. Accordingly, in this example, REST Service 154 may determine that the HTTP GET method specified for this URI is requesting a read action on the target resource.

In a different example, REST Service 154 receives an HTTP header with portion 605 that indicates a group of target resources, "api/business_groups." The HTTP GET method may be interpreted differently for a group target resource. REST Service 154 may determine the HTTP GET method specified for the "api/business_groups" URI is requesting a listing/indexing action on the target resource.

With this approach, the process involves receiving a request via HTTP, wherein an HTTP header of the request specifies an HTTP method that identifies the action requested to be performed on the one or more target resources; initiating a data read action in response to determining that the HTTP method is GET and a portion of a URL in the HTTP request identifies a single target resource; and initiating a list/index action in response to determining that the HTTP method is GET and a portion of a URL in the HTTP request identifies a group of target resources.

Continuing with FIG. 5, at block 535, UKAMS 100 queries data store 172 using the request key, and the activity data specified in the request. At block 540, UKAMS 100 determines whether authorization data exists in data store 172 associating the request key with the activity data corresponding to the request. If the authorization data exists, then the programmatic request is authorized to request performance of the action on the target resource at block 545. Authorization at block 545 may comprise invoking a method, calling an API call, queuing a request to a queue, or otherwise contacting the target resource and providing the request or some other form of programmatic invocation of the action that was included in the original request at block 500.

Continuing with the examples in FIG. 6, UKAMS 100 may query data store 172 using the key specified in HTTP header portion 605 and compare the authorization data retrieved for the key with the action and target resources requested in HTTP header portion 605. If associations exist between the key, "1234566789," the list/index action corresponding to HTTP GET method and the group target resource identifier, "api/business_groups," then the request to list/index target resources in the "api/business_groups" group of target resources is authorized. If no such association exists, the requested action is unauthorized. REST Service 154 may generate an HTTP response accordingly.

In an embodiment, if authorization data exists in mapping data that associates the request key with the requested action and with a group of target resources of which the requested target resource is a member, then the request is determined to be authorized for the action on the target resource. In such embodiment, authorization for an action on a group of target resources is also authorization for the action on each member of the group of target resources.

Continuing with FIG. 6, for example, UKAMS 100 may query the key specified in HTTP header portion 605 but may determine that no association exists for the read action, corresponding to the specified HTTP GET method, on the "api/business_groups/2" target resource. UKAMS 100 may determine that, instead, an association exists for the read action with the "api/business_groups" group of target resources. Since the requested "api/business_groups/2" target resource is a member of the "api/business_groups" group of target resources, UKAMS 100 authorizes the request corresponding to HTTP header portion 610.

In another embodiment, UKAMS 100 determines the action and the corresponding target resource requested in a request are part of one or more functional groups. If UKAMS 100 determines that the key in the request has a membership association with any of the one or more functional groups, then UKAMS 100 authorizes the request. If the request key has no association with any of the one or more functional groups, then UKAMS 100 returns that the request is unauthorized.

Accordingly using techniques described herein, authentication and authorization of a programmatic client are integrated through a re-use of a same key both for the authentication and authorization of the programmatic client. Further, the techniques may leverage user based authorization framework used by for GUI by extending the authorization framework to programmatic clients. For example, GUI authorization rights may be partitioned per action that can performed on a programmatically accessible target resource, thus enabling an administrator to configure granular authorization for each programmatic request.

6.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
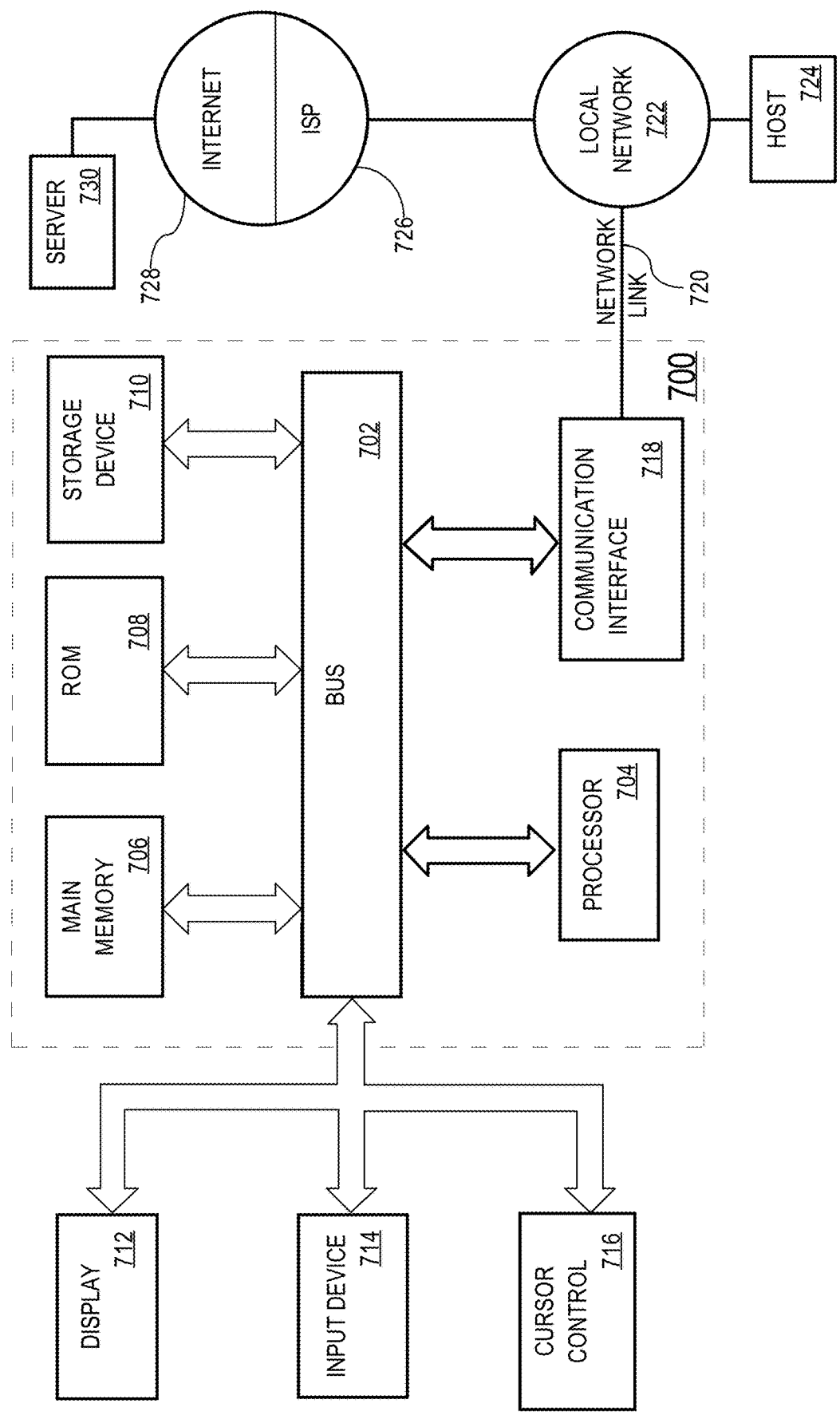
FIG. 7 is a block diagram that illustrates a computer system upon which an embodiment of the system may be implemented.

For example, FIG. 7 is a block diagram that illustrates a computer system 700 upon which an embodiment of the disclosure may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7.0 Extensions and Alternatives

In the foregoing specification, embodiments of the disclosure have been described with reference to numerous specific details that may vary from implementation to implementation. Thus, the sole and exclusive indicator of what is the disclosure, and is intended by the applicants to be the disclosure, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing method for authorizing requests from a client program running on a client computer system comprising:
   receiving, at a resource access point of one or more server computers, a programmatic request for an action on one or more target resources, wherein the request comprises data specifying the resource access point, the action to be performed on the one or more target resources at the resource access point, and a key identifying the client program running on the client computer system;
   transmitting a query comprising the key to a data store that stores digital mapping data representing one or more associations among keys, actions and target resources;
   based on result data that is received from the data store in response to the query, determining that the mapping data includes an association of the key with a first subset of target resources of the one or more target resources and with the action associated with the first subset of target resources of the one or more target resources;
   based on result data that is received from the data store in response to the query, determining that the mapping data does not include an association of the key with a second subset of target resources of the one or more target resources or with the action associated with the second subset of target resources of the one or more target resources, wherein the second subset of target resources is different than the first subset of target resources;
   wherein an association of a particular key, corresponding to a particular client program, with a particular target resource and with a particular action associated with the particular target resource, represents the particular client program having authorization to perform the particular action on the particular target resource;
   based at least in part on determining that the mapping data includes the association of the key with the first subset of target resources of the one or more target resources and with the action associated with the first subset of target resources of the one or more target resources, programmatically authorizing performance of the action on the first subset of target resources of the one or more target resources for the request; and
   based at least in part on determining that the mapping data does not include the association of the key with the second subset of target resources of the one or more target resources or with the action associated with the second subset of target resources of the one or more target resources, programmatically preventing performance of the action on the second subset of target resources of the one or more target resources for the request.

2. The method of claim 1, further comprising, based on the resource access point that received the request, determining a target resource identifier for the one or more target resources.

3. The method of claim 2, wherein the target resource identifier comprises a URI (Uniform Resource Identifier) for the one or more target resources.

4. The method of claim 3, wherein a URL (Uniform Resource Location) of the resource access point includes at least a portion of the URI of the target resource identifier for the one or more target resources.

5. The method of claim 1, further comprising receiving the request as a REST (Representational State Transfer) request via HTTP (HyperText Transfer Protocol).

6. The method of claim 1, wherein the request is an HTTP (HyperText Transfer Protocol) request received via an HTTP protocol, and wherein an HTTP header of the HTTP request specifies an HTTP method that identifies the action requested to be performed on the one or more target resources.

7. The method of claim 6, further comprising:
   initiating a data read action if it is determined that an HTTP method of the HTTP request is an HTTP GET method and a portion of a URL in the HTTP request identifies a single target resource;
   initiating a list/index action if it is determined that the HTTP method of the HTTP request is an HTTP GET method and a portion of the URL in the HTTP request identifies a group of target resources.

8. The method of claim 1, further comprising determining whether the key is valid as a condition to cause the performance of the action on the one or more target resources for the request.

9. The method of claim 1, further comprising determining whether the key is valid to cause performance of at least one action on at least one target resource by: using the key, retrieving an expiration time for the key, and comparing the expiration time for the key to the current time to determine whether the key is valid.

10. The method of claim 1, further comprising determining whether the key is valid to cause performance of at least one action on at least one target resource by: using the key, retrieving a status of the key, and determining whether the key is valid based on whether the status of the key indicates that the key has been revoked.

11. The method of claim 1:
   wherein the mapping data comprises one or more functional groups, each functional group of the functional groups represents one or more particular target resources and one or more particular actions that can be performed on the one or more particular target resources as part of a particular functionality of said each functionality group;
   wherein determining that the mapping data includes an association of the key with the one or more target resources and with the action associated with the one or more target resources comprises: determining one or more functional groups that correspond to a functionality that includes the action to be performed on the one or more target resources as specified by the request, and determining that the key of the request is a member of at least one of the one or more corresponding functional groups.

12. The method of claim 1 wherein the action to be performed on the one or more target resources at the resource access point is an access action to provide electronic access to the one or more target resources for the client computer system.

13. The method of claim 1 wherein the action to be performed on the one or more target resources at the resource access point is an update action to update one or more electronic files stored by the one or more target resources.

14. The method of claim 1 wherein the action to be performed on the one or more target resources at the resource access point is a web page viewing action to view an electronic web page associated with the one or more target resources.

15. The method of claim 14 wherein authorizing performance of the action on the first subset of target resources of the one or more target resources for the request comprises authorizing viewing, on the client computer system, a first subset of elements of the electronic web page and preventing performance of the action on the second subset of target resources of the one or more target resources for the request comprises hiding from view, on the client computer system, a second subset of elements of the electronic web page.

16. The method of claim 1, further comprising:
   creating, by an administrative computer system, a client key associated with the client computer system, wherein the client key comprises client data, the client data associated with permissive actions that a client computer may request be performed on the one or more target resources;
   sending, to the client computer system, the client key;
   wherein the key identifying the client program running on the client computer system is the client key.

17. The method of claim 16, wherein:
   determining that the mapping data includes an association of the key with a first subset of target resources of the one or more target resources and with the action associated with a first subset of target resources of the one or more target resources further comprises determining that the client data comprising the client key is associated with the action associated with the first subset of target resources of the one or more target resources;
   determining that the mapping data does not include an association of the key with a second subset of target resources of the one or more target resources nor with the action associated with the second subset of target resources of the one or more target resources further comprises determining that the client data comprising the client key is not associated with the action associated with the second subset of target resources of the one or more target resources.

18. The method of claim 1, further comprising performing, by the client program running on the client computer system, the action on the first subset of target resources of the one or more target resources for the request.

19. A data processing method for authorizing requests from a client program running on a client computer system comprising:
   receiving, in a uniform resource locator (URL) that specifies a resource access point of one or more server computers, an HTTP GET request that specifies an action on one or more target resources that are identified by at least a portion of a URI in the HTTP GET request, and wherein the request includes a key identifying the client program running on the client computer system that initiated the request;
   transmitting a query comprising the key to a data store that stores digital mapping data representing one or more associations among keys, actions and target resources;
   based on result data that is received from the data store in response to the query, determining that the mapping data includes an association of the key with a first subset of target resources of the one or more target resources and with the action associated with the first subset of target resources of the one or more target resources;
   based on result data that is received from the data store in response to the query, determining that the mapping data does not include an association of the key with a second subset of target resources of the one or more target resources or with the action associated with the second subset of target resources of the one or more target resouces, wherein the second subset of target resources is different than the first subset of target resources;
   based at least in part on the determining, programmatically authorizing performance of the action on the first subset of target resources of the one or more target resources for the request and preventing performance of the action on the second subset of target resources of the one or more target resources for the request.

20. A data processing method for authorizing requests from a client program running on a client computer system comprising:
   receiving in a uniform resource locator (URL) that specifies a resource access point of one or more server computers, an HTTP GET request that specifies an action on one or more target resources and includes a key identifying the client program running on the client computer system that initiated the request, wherein the URL of the resource access point includes at least a portion of a URI for the one or more target resources;
   determining whether the key is valid by one of:
      using the key, retrieving an expiration time for the key, and comparing the expiration time for the key to the current time to determine whether the key is valid; or
      using the key, retrieving a status of the key, and determining whether the key is valid based on whether the status of the key indicates that the key has been revoked;
   in response to determining that the key is valid:
      transmitting a query comprising the key to a data store that stores digital mapping data representing one or more associations among keys, actions and target resources;
      based on result data that is received from the data store in response to the query, determining that the mapping data includes an association of the key with a first subset of target resources of the one or more target resources and with the action associated with the one or more target resources;
      based on result data that is received from the data store in response to the query, determining that the mapping data does not include an association of the key with a second subset of target resources of the one or more target resources or with the action associated with the one or more target resources;
      based at least in part on determining that the mapping data includes the association of the key with the first subset of the one or more target resources and with the action associated with the one or more target resources:

initiating a data read action if it is determined that an HTTP method of the HTTP request is an HTTP GET method and a portion of the URL in the HTTP GET request identifies a single target resource in the first subset of target resources, and initiating a list/index action if it is determined that the HTTP method of the HTTP request is an HTTP GET method and a portion of the URL in the HTTP GET request identifies a group of target resources in the first subset of target resources.

* * * * *